US011089502B2

(12) United States Patent
Khay-Ibbat et al.

(10) Patent No.: US 11,089,502 B2
(45) Date of Patent: Aug. 10, 2021

(54) OPTIMIZING OPERATION OF CONSTRAINED USER EQUIPMENT

(71) Applicant: Apple Inc., Cupertino, CA (US)

(72) Inventors: Samy Khay-Ibbat, San Francisco, CA (US); Tarik Tabet, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/658,931

(22) Filed: Oct. 21, 2019

(65) Prior Publication Data

US 2020/0053589 A1 Feb. 13, 2020

Related U.S. Application Data

(63) Continuation of application No. 14/996,759, filed on Jan. 15, 2016, now Pat. No. 10,484,905.

(60) Provisional application No. 62/107,794, filed on Jan. 26, 2015.

(51) Int. Cl.
| | |
|---|---|
| *H04W 4/00* | (2018.01) |
| *H04W 28/02* | (2009.01) |
| *H04W 36/00* | (2009.01) |
| *H04W 36/30* | (2009.01) |
| *H04L 12/805* | (2013.01) |
| *H04M 1/253* | (2006.01) |
| *H04W 28/14* | (2009.01) |

(52) U.S. Cl.
CPC ... *H04W 28/0231* (2013.01); *H04W 36/0022* (2013.01); *H04L 47/36* (2013.01); *H04M 1/2535* (2013.01); *H04W 28/14* (2013.01); *H04W 36/305* (2018.08)

(58) Field of Classification Search
None
See application file for complete search history.

(56) References Cited

U.S. PATENT DOCUMENTS

2006/0153122 A1* 7/2006 Hinman ............... H04L 67/04
370/328

* cited by examiner

*Primary Examiner* — Zewdu A Beyen
(74) *Attorney, Agent, or Firm* — Fay Kaplun & Marcin, LLP (57) ABSTRACT

A user equipment (UE) and associated method performs a voice call with a network, including exchanging voice packets, determines an uplink data transmission to be performed concurrently with the voice call and stores the uplink data transmission in a buffer. A base station and associated method performs a voice call with a UE, determines a downlink data transmission for the UE is to be performed concurrently with the voice call and stores the downlink data transmission in a buffer when the UE is a predetermined type. A UE and associated method associates with a first access point (AP), determines first performance characteristics of a connection with the first AP, determines second performance characteristics of a potential connection with a second AP, declares a radio link failure when the second performance characteristics exceed the first performance characteristics to trigger a handover procedure from the first AP to the second AP.

17 Claims, 8 Drawing Sheets

OPTIMIZING OPERATION OF CONSTRAINED USER EQUIPMENT

PRIORITY CLAIM/INCORPORATION BY REFERENCE

This application claims priority to U.S. Provisional Application 62/107,794 entitled "Optimizing Operation of Constrained User Equipment," filed on Jan. 26, 2015, the entirety of which is incorporated herein by reference.

BACKGROUND

As designs for wireless mobile devices (e.g., user equipment (UE)) evolve, there is a trend toward smaller devices and more streamlined housings. Some examples of these smaller devices or more streamlined designs include wearable devices such as watches that are worn on the wrist or glasses that are worn in the manner of traditional eyewear. Another example is pendants that may be attached to a strap and hung around a user's neck or wrist. A final example is a clip-on that may be clipped onto an article of clothing such as pockets or clipped onto an accessory such as a bag or purse.

These smaller and streamlined designs generally result in less available space for components of the wireless mobile devices. For example, the batteries of such devices need to be smaller and therefore have a correspondingly smaller capacity. In another example, the designs generally require that all antennas be internal antennas so as not to change the form of the mobile device. This may result in shorter antennas because of the lack of availability of space within the housing of the mobile device. These constraints on the design of the wireless devices may result in a loss of performance for certain wireless functionalities.

However, users expect these devices to operate and have similar performance characteristics as the standard wireless mobile devices to which the users are accustomed. Thus, if these smaller mobile devices have a loss of performance, the user experience will be degraded and users are less likely to adopt these new types of devices.

SUMMARY

According to an exemplary embodiment a method is described that is performed by a user equipment configured to establish a connection with a network. The method includes performing a voice call with the network, the voice call including exchanging voice packets with the network, determining an uplink data transmission to be performed while the voice call is being performed and storing the uplink data transmission in a buffer.

According to a further exemplary embodiment, a user equipment (UE) is described. The user equipment has a transceiver and a processor coupled to the transceiver, wherein the processor is configured to perform a voice call with a network, the voice call including exchanging voice packets with the network, determine an uplink data transmission to be performed while the voice call is being performed and store the uplink data transmission in a buffer.

According to another exemplary embodiment, a method is described that is performed by a network component of a network configured to establish a connection with a user equipment. The method includes determining a type of the user equipment, performing a voice call with the user equipment, determining a downlink data transmission for the user equipment is to be performed while the voice call is being performed and storing the downlink data transmission in a buffer when the user equipment is a predetermined type.

According to a further exemplary embodiment, a base station is described. The base station has a transceiver, a non-transitory memory having a program stored thereon and a processor executing the program, wherein the execution of the program causes the processor to perform operations. The operations include determining a type of user equipment in connection with a network, performing a voice call with the user equipment, determining a downlink data transmission for the user equipment is to be performed while the voice call is being performed and storing the downlink data transmission in a buffer when the user equipment is a predetermined type.

According to an exemplary embodiment a method is described that is performed by a user equipment configured to establish a connection with a network. The method includes associating with a first access point of the network, determining first performance characteristics of a first connection with the first access point, determining second performance characteristics of a potential second connection with a second access point of the network, declaring a radio link failure (RLF) when the second performance characteristics exceed the first performance characteristics to trigger the first access point to perform a handover procedure and associating with the second access point of the network.

DETAILED DESCRIPTION

The exemplary embodiments may be further understood with reference to the following description and the related appended drawings, wherein like elements are provided with the same reference numerals. The exemplary embodiments are related to an apparatus, systems and methods for optimizing an operation of a user equipment (UE) that has known constraints. The constraints may be associated with a higher likelihood for select failures to occur. For example, the UE may be limited in power supply and/or antenna configuration. The exemplary embodiments provide various mechanisms to address several drawbacks associated with these constraints. In a first mechanism, the exemplary embodiments may control a manner in which data transmissions are performed during a voice communication on both a UE side and a network side. In a second mechanism, the exemplary embodiments may utilize a forgiving call establishment procedure on a network side. In a third mechanism, the exemplary embodiments may utilize an adaptive paging procedure on a network side. In a fourth mechanism, the exemplary embodiments may utilize a proactive handover procedure on a UE side.

Figure 1:
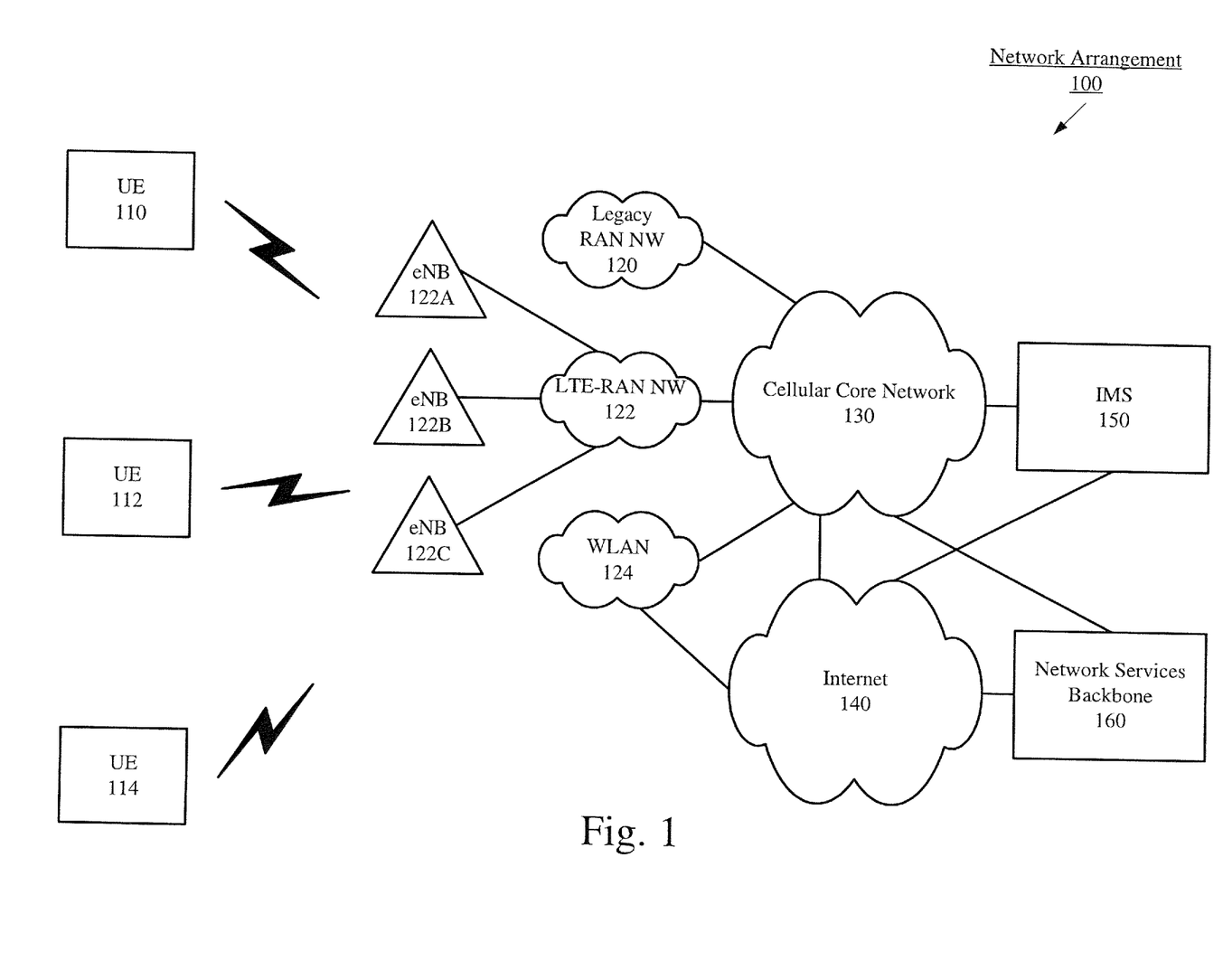
FIG. 1 shows an exemplary network arrangement according to various embodiments described herein.

FIG. 1 shows an exemplary network arrangement 100. The exemplary network arrangement 100 includes UEs 110-114. Those skilled in the art will understand that the UEs 110-114 may be any type of electronic component that is configured to communicate via a network, e.g., mobile phones, tablet computers, desktop computers, smartphones, phablets, embedded devices, wearables, etc. It should also be understood that an actual network arrangement may include any number of UEs being used by any number of users and being associated with any number of these users where the user may be associated with one or more of the UEs. That is, the example of three (3) UEs 110-114 is only provided for illustrative purposes.

The exemplary embodiments may further relate to when the UEs 110-114 are wearables (e.g., watches, pendants, glasses, clip-ons, etc.). As a wearable, the UEs 110-114 may include components that enable the UE to be worn in a hands-free manner. Due to the hands-free nature, the UEs 110-114 may have a relatively small volume or occupy a small space compared to other mobile devices. Those skilled in the art will understand that the volume of the UEs 110-114 may pose structural challenges to incorporate select features. In a first example, the UEs 110-114 may be configured to incorporate a limited power supply that holds less power than other available limited power supplies due to these other larger power supplies being incapable of being incorporated into the housing of the UEs 110-114. In a second example, the UEs 110-114 may incorporate an antenna or multiple antennas that operate on limited frequencies. As such, other features such as certain frequency related cycles may be forced to be lengthened. Due to these known drawbacks of providing a housing of the UEs 110-114 in a small volume, the exemplary embodiments are configured to address select ones of these drawbacks.

It should be noted that the use of wearables is only exemplary. Those skilled in the art will understand that the exemplary embodiments may be applied to any UE that experiences any of the constraints to which the mechanisms described herein are configured to address. For example, the UE may be a mobile phone designed with a minimal volume such that the antenna constraint may still be present despite not being a wearable. Thus, the wearable used herein for the UEs 110-114 may represent any electronic device that may experience power and/or antenna constraints or any other constraint that may degrade connection performance.

Each of the UEs 110-114 may be configured to communicate directly with one or more networks. In this example, the networks with which the UEs 110-114 may communicate are a legacy radio access network (RAN) 120, a LTE RAN (LTE-RAN) 122, and a wireless local area network (WLAN) 124. In this example, each of the networks 120-124 is a wireless network with which the UEs 110-114 may communicate wirelessly. However, it should be understood that the UEs 110-114 may also communicate with other types of networks and may also communicate using a wired connection. With regards to the exemplary embodiments, the UEs 110-114 may establish a connection with the LTE-RAN 122 to, among other functionalities, perform Voice over LTE (VoLTE) calls with other UEs. For example, the UEs 110-114 may have a LTE chipset and communicate with the LTE-RAN 122. In another example, the UEs 110-114 may have a GSM chipset and communicate with the legacy RAN 120 that is a GSM network. Again, the use of three (3) networks is only exemplary and there may be any other number of networks with which the UEs 110-114 may communicate.

The legacy RAN 120 and the LTE-RAN 122 are portions of cellular networks that may be deployed by cellular providers (e.g., Verizon, AT&T, Sprint, T-Mobile, etc.). These networks 120 and 122 may include, for example, base client stations (Node Bs, eNodeBs, HeNBs, etc.) that are configured to send and receive traffic from UEs that are equipped with the appropriate cellular chip set. Examples of the legacy RAN 120 particularly using the GSM configuration may include those networks that are generally labeled as 2G and/or 3G networks and may include circuit switched voice calls and packet switched data operations. Those skilled in the art will understand that the cellular providers may also deploy other types of networks, including further evolutions of the cellular standards, within their cellular networks. The WLAN 124 may include any type of wireless local area network (WiFi, Hot Spot, IEEE 802.11x networks, etc.). Those skilled in the art will understand that there may be thousands, hundreds of thousands or more of different WLANs deployed in the United States alone. For example, the WLAN 124 may be the user's home network, the user's work network, a public network (e.g., at a city park, coffee shop, etc.). Generally, the WLAN 124 will include one or more access points that allow the UEs 110-114 to communicate with the WLAN 124. However, as noted above, the exemplary embodiments relate to the UEs 110-114 utilizing the LTE-RAN 122 to perform VoLTE calls.

In addition to the networks 120-124, the network arrangement 100 also includes a cellular core network 130 and the Internet 140. The cellular core network 130, the legacy RAN 120, and the LTE-RAN 122 may be considered a cellular network that is associated with a particular cellular provider (e.g., Verizon, AT&T, Sprint, T-Mobile, etc.). The cellular core network 130 may be considered to be the interconnected set of components that manages the operation and traffic of the cellular network. The interconnected components of the cellular core network 130 may include any number of components such as servers, switches, routers, etc. The cellular core network 130 also manages the traffic that flows between the cellular network and the Internet 140.

The network arrangement 100 also includes an IP Multimedia Subsystem (IMS) 150. The IMS 150 may be generally described as an architecture for delivering multimedia services to the UEs 110-114 using the IP protocol. The IMS 150 may include a variety of components to accomplish this task. For example, a typical IMS 150 includes a Home Subscriber Server (HSS) that stores subscription information for a user of the UEs 110-114. This subscription information is used to provide the correct multimedia services to the user such as a VoLTE call. The IMS 150 may communicate with the cellular core network 130 and the Internet 140 to provide the multimedia services to the UEs 110-114. The IMS 150 is shown in close proximity to the cellular core network 130 because the cellular provider typically implements the functionality of the IMS 150. However, it is not necessary for this to be the case such as when the IMS 150 is provided by another party.

Thus, the network arrangement 100 allows the UEs 110-114 to perform functionalities generally associated with computers and cellular networks. For example, the UEs 110-114 may perform the VoLTE calls to other parties, may browse the Internet 140 for information, may stream multimedia data to the UEs 110-114, etc.

The network arrangement 100 may also include a network services backbone 160 that is in communication either directly or indirectly with the Internet 140 and the cellular core network 130. The network services backbone 160 may be generally described as a set of components (e.g., servers, network storage arrangements, etc.) that implement a suite of services that may be used to extend the functionalities of the UEs 110-114 in communication with the various networks. The network services backbone 160 may interact with the UEs 110-114 and/or the networks 120, 122, 124, 130, 140 to provide these extended functionalities.

The network services backbone 160 may be provided by any entity or a set of entities. In one example, the network services backbone 160 is provided by the supplier of one or more of the UEs 110-114. In another example, the network services backbone 160 is provided by the cellular network provider. In still a further example, the network services backbone 160 is provided by a third party unrelated to the cellular network provider or the supplier of the UEs 110-114.

The exemplary embodiments relate to the UEs 110-114 establishing a connection to a first network such as the LTE-RAN 122. Specifically, the UEs 110-114 may associate with an access point of the LTE-RAN 122 such as an evolved Node B (eNB). The LTE-RAN 122 may include a plurality of eNBs 122A, 122B, 122C, each having a respective operating area such that when the UE is disposed within a respective operating area, the UE may associate with the respective eNB. It should be noted that the use of the LTE-RAN 122 and the eNBs 122A-C is only exemplary. As will be become more evident below, those skilled in the art will understand that the exemplary embodiments may be used with any type of network and its corresponding access points.

For exemplary purposes, the eNBs 122A, 122B, 122C may be considered to be neighboring in which the operating area of a first one of the eNBs 122A-C may overlap with the operating area of a second one of the eNBs 122A-C. It should be noted that the use of three eNBs 122A-C is only exemplary. Those skilled in the art will understand that the LTE-RAN 122 may include any number of eNBs. It should also be noted that the use of neighboring eNBs 122A-C is only exemplary. Those skilled in the art will understand that the eNBs 122A-C may be located in various locations throughout the LTE-RAN 122.

Initially, the UEs 110-114 may establish a connection to the LTE-RAN 122. Those skilled in the art will understand that any association procedure may be performed for the UEs 110-114 to connect to the LTE-RAN 122. For example, as discussed above, the LTE-RAN 122 may be associated with a particular cellular provider where the UE 110-114 and/or the user thereof has a contract and credential information (e.g., stored on a SIM card). Upon detecting the presence of the LTE-RAN 122, the UEs 110-114 may transmit the corresponding credential information and perform a handshake procedure to associate with the LTE-RAN 122. More specifically, the UEs 110-114 may associate with a specific access point (e.g., the eNBs 122A-C of the LTE-RAN 122). As will be described in further detail below, the eNBs 122A-C may exchange signals with the UEs 110-114 when various functionalities are to be performed such as establishing a call involving transmission of pages.

The UEs 110-114 may execute a plurality of applications that perform predetermined functionalities to address drawbacks such as those discussed above in view of being a wearable and/or having a reduced volume to accommodate its different components. The UEs 110-114 may represent any electronic device that is configured to perform wireless functionalities such as a portable device (e.g., a smartphone, a tablet, a phablet, a laptop, a wearable, etc.) or a client stationary device (e.g., a desktop terminal). The UEs 110-114 may include various components such as a processor, a memory arrangement, a transceiver, etc.

In a first mechanism, the UEs 110-114 according to the exemplary embodiments may address drawbacks based on hardware or software constraints of the UEs 110-114. Examples of constraints of the UEs 110-114 may include an antenna constraint (e.g., a length of the antenna may be shortened and cause a constraint associated with a capacity to transmit information such as voice and/or data, a power supply constraint (e.g., a smaller physical power supply may result in less available power compared to mobile units having a larger physical power supply), etc. However, those skilled in the art will understand that there may be various types of constraints that the UEs 110-114 are subject to and the exemplary embodiments may be used to address any of these constraints.

Where time sensitive information such as voice transmissions are involved, an interruption in this voice service may cause a poor user experience. Such an interruption may be caused by the device attempting to perform simultaneous voice and data transmissions. The above described constraints may impact performance when both voice and data transmissions are performed. The exemplary embodiments provide a manner of controlling the UE transmissions to account for the constraints in the design of the UEs 110-114.

Figure 2A:
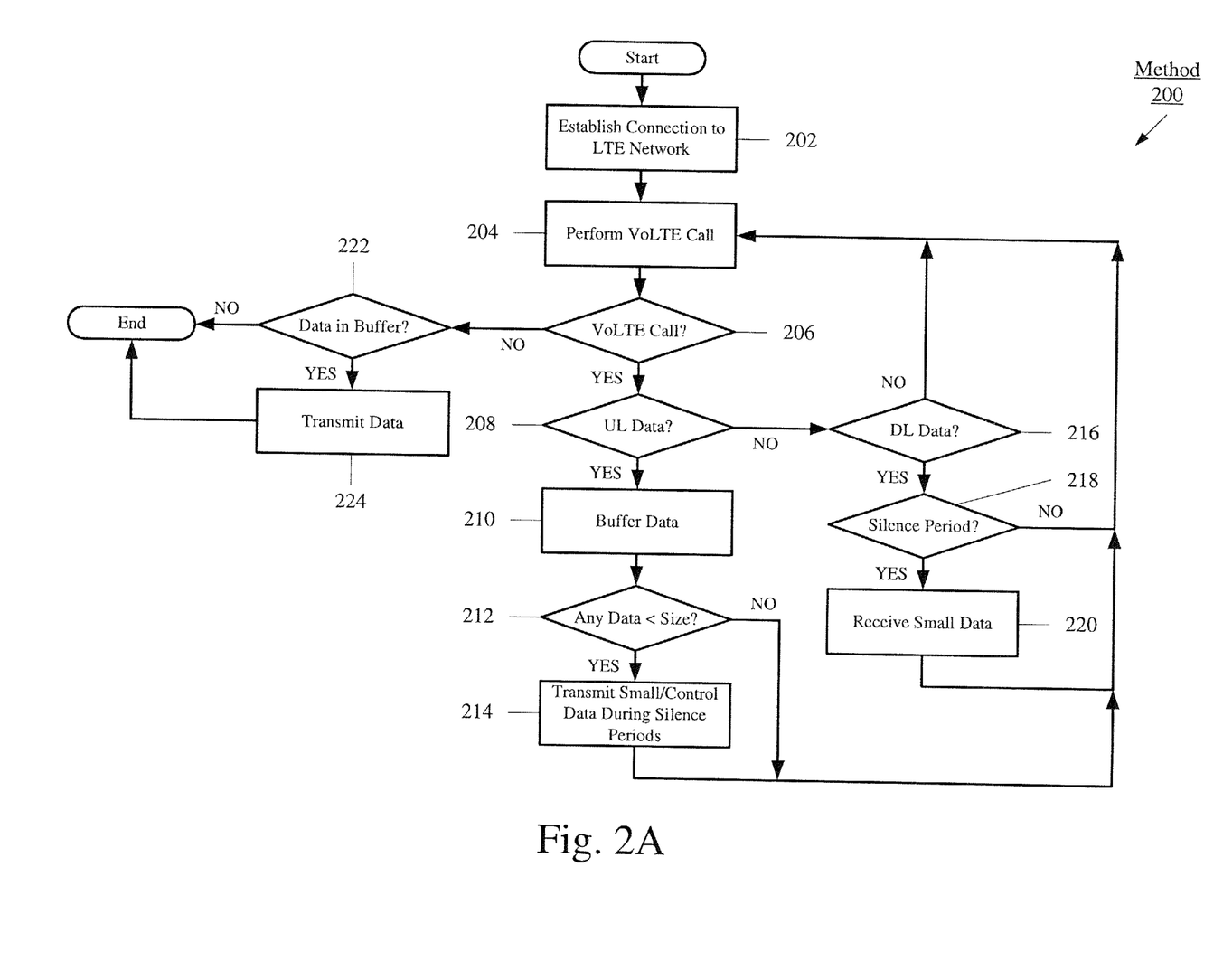
FIG. 2A shows an exemplary user equipment method for data transmissions during a voice call according to various embodiments described herein.

FIG. 2A shows an exemplary UE method 200 for data transmissions during a voice call. The UE method 200 relates to a UE-side operation. Specifically, the method 200 may relate to a manner in which the data transmissions are performed by its own operation and in conjunction with the eNB to which it is associated. As will be described in further detail below, the method 200 may include a buffering feature such that voice transmissions are not interrupted and data transmissions are buffered until the data can be transmitted without interfering with the voice transmissions.

In 202, the UE establishes a connection with the LTE-RAN 122. For example, the UE 110 may connect to the LTE-RAN by associating with the eNB 122A using any known association and handshake procedure. In 204, the UE 110 may perform a Voice over LTE (VoLTE) call. Those skilled in the art will understand the mechanism used to perform such a functionality using Internet Protocol (IP) features for voice transmissions to be made. Furthermore, the VoLTE call is performed in real time between a user of the UE 110 and a user of a further UE or any other device capable of receiving a voice call. The voice transmissions are time sensitive because the callers expect the voice call to be a natural conversation without any time delays. The method 200 further relates to when the VoLTE call is being performed and when data transmissions are also to be performed.

In 206, a determination is made whether the VoLTE call is still being performed. At this stage, the VoLTE call has just been initiated. Thus, the UE 110 may continue the method 200 to 208 since the VoLTE call is still being performed. With the VoLTE call being performed, the UE 110 continues to perform all voice transmissions associated with the VoLTE call. In 208, the UE 110 determines whether there is any uplink data that is not associated with the VoLTE call. That is, the UE 110 determines whether any data transmissions are to be transmitted from the UE 110 to the eNB 122A. The UE 110 may determine this on its own using any of its application layers that schedule the data transmission. If there is uplink data, the UE 110 continues the method 200 to 210.

In 210, the UE 110 buffers the uplink data in a memory arrangement or other storage component. The UE 110 may perform an initial configuration upon the VoLTE call being initiated. Specifically, the UE 110 may block any non-VoLTE information on both the UE-side and the eNB-side. Due to this blockage, the UE 110 may buffer the uplink data at the application layer and flush uplink data at any lower layer, such as a Media Access Control (MAC) layer. In a particular scenario, when uplink data is being transmitted at the time the VoLTE call is initiated, this uplink data may also be buffered immediately such that the VoLTE call is not interrupted.

In a further feature, the exemplary embodiments may enable smaller data transmissions to be transmitted during the VoLTE call where the size of the smaller data transmissions is selected to ensure that the VoLTE call is not interrupted. Examples of smaller data transmissions include SMS messages, email summaries, etc. The size may be a predetermined value or may be dynamic based upon the capabilities of the UE at the time the VoLTE call is being performed. To further ensure a likelihood that the VoLTE call is not interrupted, the smaller data transmissions may be transmitted during silence periods. Those skilled in the art will understand that the VoLTE call utilizes silence periods where silence packet generation occurs at predetermined intervals such as every 160 ms. Therefore, the smaller data transmissions may be transmitted from the UE 110 to the eNB 122A during these silence periods as the VoLTE call has a small probability of being interrupted. Accordingly, in 212, the UE 110 determines whether any data transmission that has been buffered qualifies as a smaller data transmission such as a short message service (SMS) transmission, email summary, etc. based upon a threshold size. If none of the data transmissions in the buffer is smaller than the threshold size, the UE 110 returns the method to 204 where the VoLTE call is continued. However, if at least one of the data transmissions is less than the threshold size, the UE 110 continues the method 200 to 214. In 214, the UE 110 transmits the smaller data transmissions during the silence periods. During times when there are more than one smaller data transmission, the UE 110 may schedule these based upon any configuration such as with a first in, first out policy, a priority policy, an importance policy, etc. In this respect, the method 200 may include additional processes to address multiple smaller data transmissions that are to be performed during the VoLTE call. The UE 110 may also transmit control data during the silence periods. For example, the control data may include network measurements as determined by the UE 110, MAC data including channel estimation, etc. It should be noted that the method 200 may include different processes such as when a determination is made that no uplink data is present but still proceed with 210-214 such that the control data may still be transmitted during the silence periods.

Returning to 208, if there is no uplink data, the UE 110 may also determine whether there is any downlink data. Thus, in 216, the UE 110 makes this determination of whether there is any downlink data. That is, the UE 110 determines whether any data transmissions are to be received from the eNB 122A. The UE 110 may determine this based upon signal exchanges with the eNB 122A such as via the Physical Downlink Control Channel (PDCCH). If there is no downlink data, the UE 110 may return the method 200 to 204 where the VoLTE call is continued. However, if the UE 110 determines that there is downlink data for the UE 110, the method 200 continues to 218. The downlink data may also be received during a silence period. Thus, in 218, the UE 110 determines whether there is a silence period and may also determine whether the silence period is being utilized for the smaller data transmissions in the uplink as performed in 214. If the silence period is available for receiving smaller data transmissions in the downlink, in 220, the smaller data transmission is received.

It should be noted that the receiving of the smaller data transmissions in the downlink has an assumption that the eNB 122A is also configured for this feature. Accordingly, the eNB 122A should be aware that the UE 110 is utilizing this feature on its end. As will be described in further detail below, the eNB 122A may be configured to make this determination and update its operation when the UE 110 performs the VoLTE call.

Returning to 206, when the VoLTE call is ended, the UE 110 may continue the method 200 to 222. During various iterations of the previous processes of the method 200, data transmissions that are larger than the threshold size may have been buffered. Thus, in 222, the UE 110 determines whether there are any uplink data transmissions in the buffer. If there are no uplink data transmissions in the buffer, the method 200 may end. For example, the uplink data transmissions may have all been smaller than the threshold size and all transmitted during the VoLTE call in the silence periods. In another example, there may have been no uplink data transmissions to be buffered in the first place. However, if there is at least one uplink data transmission in the buffer, the UE 110 may continue the method 200 to 224 where the uplink data transmissions are transmitted from the UE 110 to the eNB 122A. It should be noted that the smaller data transmissions may not have all been transmitted during the VoLTE call. Therefore, the buffer may also include the unsent smaller data transmissions, which may be transmitted in 224.

Figure 2B:
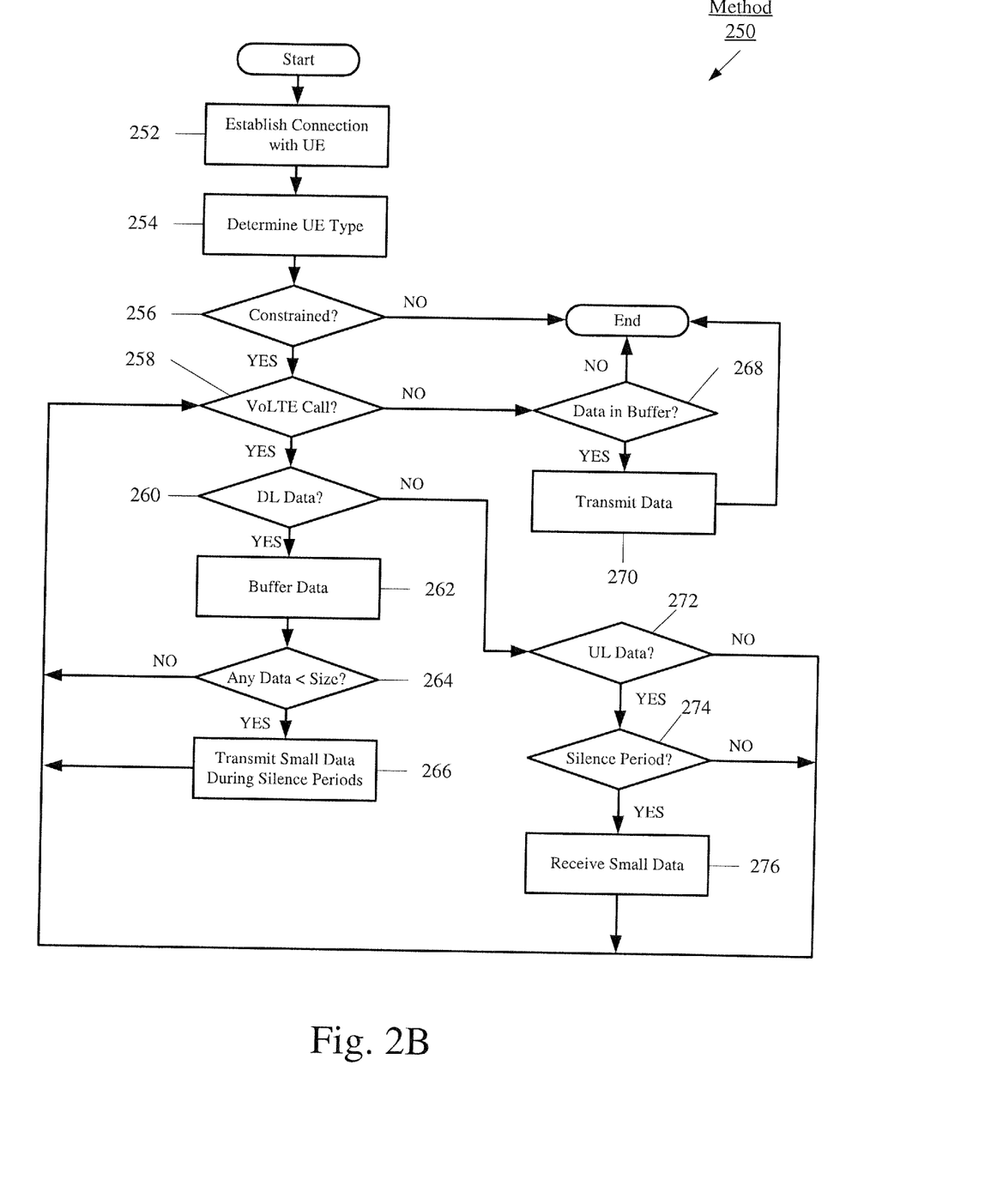
FIG. 2B shows an exemplary network method for data transmissions during a voice call according to various embodiments described herein.

FIG. 2B shows an exemplary network method 250 for data transmissions during a voice call. The network method 250 relates to a network-side operation at the eNB to which the UE is associated. The method 250 may relate to a manner in which the data transmissions are performed by the eNB in conjunction with the UE. The method 250 may also include a buffering feature.

In 252, the LTE-RAN 122 establishes a connection with the UE. For example, the eNB 122A may connect to the UE 110 through an association and handshake procedure. The association procedure and/or setup procedure (e.g., for an application) may include different types of channel or connection parameters. For example, in a Random Access Channel (RACH), the eNB 122A may receive information identifying the UE 110, which may include a type of mobile unit (e.g., a wearable). Thus, in 254, the eNB 122A may determine the type of mobile unit that the UE 110 is. Specifically, the eNB 122A may determine that the UE 110 is a constrained mobile unit. In 256, the eNB 122A determines whether the UE 110 is constrained such as with the antenna and/or power. If the UE 110 is not constrained, the eNB 122A may treat the UE 110 in any conventional manner.

If the eNB 122A determines that the UE 110 is a constrained device, the eNB 122A continues the method 250 to 258. Initially, the determination that the UE 110 is a constrained device may entail further configuration features. Specifically, the eNB 122A may be aware that the UE 110 may utilize the above-described buffering feature, particularly when time sensitive information is also being transmitted such as during a VoLTE call. Accordingly, when the UE 110 utilizes the LTE-RAN 122 for these applications, the eNB 122A may be configured to operate with the buffering functionality.

In 258, the eNB 122A determines whether the UE 110 is performing a VoLTE call. The eNB 122A may make this determination in a variety of manners. For example, the UE 110 may request a reliable connection (RC) to perform the VoLTE call. Those skilled in the art will understand that when the connection between the UE 110 and the eNB 122A is established, a default bearer may be assigned by the eNB 122A for the UE 110. However, a more reliable way of exchanging information is via a dedicated bearer. The dedicated bearer may be provided during a VoLTE call as a pre-configuration of the LTE-RAN 122 (e.g., via an IP Multimedia Subsystem (IMS 150)). The dedicated bearer may be part of the request of the RC. The use of the RC may also be indicative of the buffer feature that is about to be used by the UE 110.

When the eNB 122A determines that the UE 110 is performing the VoLTE call, in 260, the eNB 122A determines whether there are any downlink data transmissions bound from the eNB 122A for the UE 110. If there are no downlink data transmissions, the eNB 122A returns the method 250 to 258 to determine whether the VoLTE call is still being performed. However, if the eNB 122A determines that there is at least one downlink data transmission for the UE 110, the eNB 122A continues the method 250 to 262. In 262, the eNB 122A buffers the downlink data transmission in a database or other storage component. In a substantially similar manner as described above with reference to the UE operation during method 200, the eNB 122A may also incorporate a size parameter to determine whether smaller downlink data transmissions are allowed during the VoLTE call. Thus, in 264, the eNB 122A determines whether any of the downlink data transmissions are less than the threshold size discussed above. If no downlink data transmission is in the buffer, the eNB 122A returns the method 250 to 258. However, if there is at least one smaller downlink data transmission, the eNB 122A continues the method 250 to 266 where these are transmitted during silence periods. As the silence periods are periodic and the signal exchanges with the UE 110 may indicate availability, the eNB 122A may transmit the smaller downlink data transmissions accordingly.

Returning to 260, if there is no downlink data, the eNB 122A may also determine whether there is any uplink data. Thus, in 272, the enB 122A makes this determination of whether there is any uplink data that is to be received from the UE 110. The eNB 122A may determine this based upon signal exchanges with the UE 110. If there is no uplink data, the eNB 122A may return the method 250 to 258 where the VoLTE call is continued. However, if the eNB 122A determines that there is uplink data for the eNB 122A, the method 250 continues to 274. The uplink data may be received during a silence period. Thus, in 274, the eNB 122A determines whether there is a silence period and may also determine whether the silence period is being utilized for the smaller data transmissions in the downlink as performed in 266. If the silence period is available for receiving smaller data transmissions in the uplink, in 276, the smaller data transmission is received.

Returning to 258, when the VoLTE call is determined to have ended, the eNB 122A continues the method 250 to 268. For example, the eNB 122A may determine that the dedicated bearer is no longer being used and the context for the VoLTE call is no longer required. In 268, the eNB 122A determines whether there is any downlink data transmission in the buffer. If there is at least one downlink data transmission, the eNB 122A continues the method 250 to 270 where the buffered uplink data transmissions are sent to the UE 110.

It should be noted that the method 200 of FIG. 2A includes downlink data transmissions from the eNB 122A to the UE 110 as well as uplink data transmissions from the UE 110 to the eNB 122A. In contrast, the method 250 of FIG. 2B includes only the uplink data transmissions from the eNB 122A to the UE 110. However, the eNB 122A may be assumed to not be constrained in either an antenna or power respect. Thus, the uplink data transmissions from the UE 110 to the eNB 122A may be assumed to be received as downlink data transmissions by the eNB 122A whenever the UE 110 makes these transmissions.

In a second mechanism, the eNBs 122A-C according to the exemplary embodiments may address a drawback related to the constraints that cause limitations on the UEs 110-114. Under substantially similar reasons for the constraints as described above, this may result in degraded paging performance as well as call establishment performance even when the page is actually received by the UE. Because there is an expectation that the paging procedure and/or the call establishment procedure may fail, the eNBs 122A-C according to the exemplary embodiments provide further features to improve upon these procedures with UEs 110-114 having these constraints.

Figure 3:
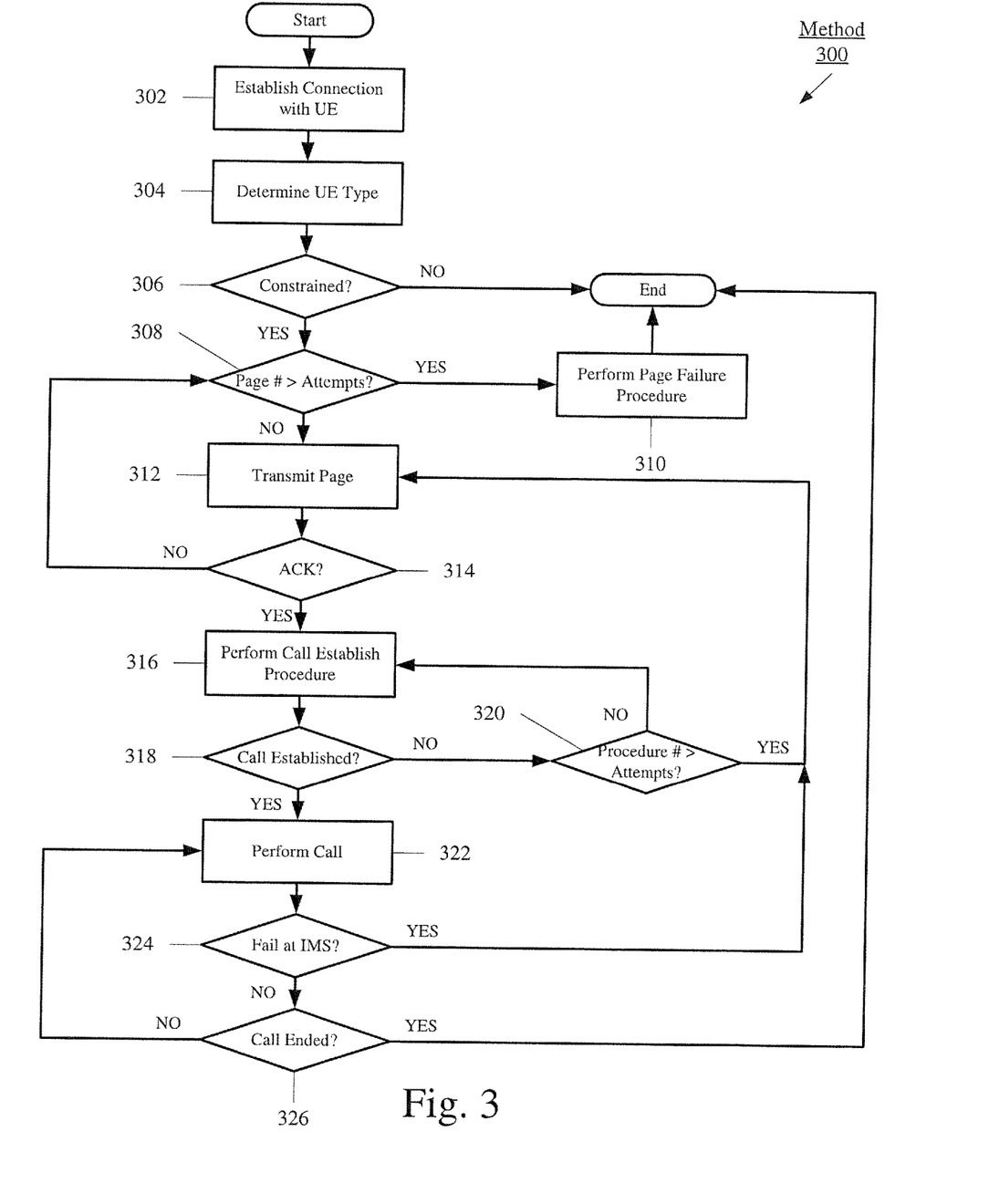
FIG. 3 shows an exemplary network method for establishing a call for a user equipment according to various embodiments described herein.

FIG. 3 shows an exemplary network method 300 for establishing a call for a UE. The network method 300 relates to a network operation. Specifically, the method 300 may relate to a manner in which the eNB is configured to page and establish a call connection with the UE when the UE is determined to have a constraint. As will be described in further detail below, the method 300 may include a forgiving procedure performed by the eNB in paging the UE as well as establishing the call for the UE. It should be noted that when the network is performing the method 300, the UE may operate in a known manner and not be required to be altered in any way.

In 302, the LTE-RAN 122 establishes a connection with the UE. For example, the eNB 122A may connect to the UE 110 through an association and handshake procedure. In 304, the eNB 122A may determine the type of mobile unit that the UE 110 is. As described above, the RACH may be used as a basis in this determination. In 306, the eNB 122A determines whether the UE 110 is constrained such as with the antenna or power. If the UE 110 is determined to be constrained, the eNB 122A continues the method 300 to 308.

In step 308, the eNB 122A may determine whether a number of pages associated with a specific call establishment procedure is greater than a threshold attempt value. That is, the eNB 122A may have a voice call to connect to the UE 110. Thus, the eNB 122A may be attempt to connect the call via performing a call establishment procedure with the UE110. The eNB 122A initiates this call establishment procedure with a page. In this example, it may be considered that at this stage, no pages have been transmitted such that the number of pages is lower than the threshold attempt value. The threshold attempt value may be a predetermined value or a dynamic value based upon the capabilities of the UE 110 and/or the current network parameters. For example, the eNB 122A may utilize a default paging attempt threshold value but may increase this value when it is determined the UE 110 is a constrained device.

When the number of pages is less than the threshold attempt value, the eNB 122A continues the method 300 to 312. In 312, the eNB 122A transmits the page for the specific call establishment procedure. In 314, the eNB 122A determines whether an acknowledgement (ACK) has been received in response to the page being transmitted. If the ACK has not been received, the eNB 122A returns the method 300 to 308 to make another determination of whether the number of pages exceeds the threshold attempt value. If the iterations of these processes result in the number of pages being transmitted with no ACK being received and eventually exceeding the threshold attempt value, the eNB 122A continues the method 300 to 310. In 310, the eNB 122A determines that the UE 110 cannot be paged and proceeds according to a known page failure procedure.

Returning to 314, when the eNB 122A determines that the ACK has been received from the UE 110 in response to the page being transmitted, the eNB 122A continues the method 300 to 316. It should be noted that the ACK may have been transmitted by the UE 110 at a lower layer as a simple response that the page has been received with no consideration of higher level functionalities. However, in view of the ACK being received by the eNB 122A from the UE 110, the eNB 122A may perform the forgiving call establishment procedure according to the exemplary embodiments with the knowledge that the UE 110 may be reached. The eNB 122A may further be configured to adjust timers based upon the determination that the UE 110 is constrained and the ACK has been determined. For example, the LTE-RAN 122 may utilize RACH and RRC establishment timers that provide a duration of time in which the respective procedures may be performed prior to determining subsequent actions (e.g., failure procedure). In the exemplary embodiment, the eNB 122A may extend these timers to last longer than when the UE is not constrained.

Based upon the determination that the UE 110 is reachable (e.g., because the UE 110 provided an ACK to the eNB 122A), in 316, the eNB 122A performs the call establishment procedure. For a variety of reasons, although the page has been received and an ACK transmitted by the UE 110, the call establishment procedure may still result in a failure. Thus, the eNB 122A may continue the method 300 to 320. In 320, the eNB 122A determines whether a number of call establishment procedure attempts is greater than a further threshold attempt value. If the number of call establishment procedure attempts is less than the further threshold attempt value, the eNB 122A returns the method to 316 to continue the attempts at performing the call establish procedure. That is, the failure of the call establishment procedure does not result in an automatic result of a page failure. Again, the eNB 122A has received the ACK and proceeds with the knowledge that the UE 110 is reachable. The call establishment procedure may include the RACH and RRC procedures and their respective timers. Thus, the eNB 122A may further incorporate the timers into this process to determine how the method 300 is to proceed. For example, when the number of establishment procedures exceeds the threshold value or when the timer has expired, then the eNB 122A may continue the method 300 from 320 to 312. The eNB 122A may further consider both of these factors where one factor may supercede the other. For example, when the number of establishment procedures does not exceed the threshold value but the timer has expired or vice versa, the eNB 122A may continue the method 300 from 320 to 312.

However, if the eNB 122A determines that the number of call establishment procedure attempts is greater than the further threshold attempt value, the eNB 122A returns the method 300 to 312. Again, rather than considering multiple failures of the call establishment procedure as resulting in an automatic page failure, the eNB 122A attempts to transmit a page once again. In this manner, the eNB 122A is more forgiving in attempting to transmit a page as well as establishing a call based upon this page, particularly when an ACK is received for the page.

Furthermore, the eNB 122A may perform the method 300 for a time period subsequent to the call being established. Returning to 318, the eNB 122A may determine that the call has indeed been established. Thus, in 322, the call is performed. In 324, the eNB 122A may determine whether there is a failure for the call, particularly at the IMS 150. If there is no failure, the eNB 122A continues the method 300 to 326 to determine whether the call has ended. However, if there is a failure of the call at the IMS layer, the eNB 122A may again not consider this a complete call establishment failure. Instead, the eNB 122A returns the method 300 to 312 to again transmit a page and perform the call establishment procedure to resume the already ongoing call. Furthermore, the eNB 122A may further incorporate the adjusted timers such as the RRC establishment and/or IMS timer used in current IMS call flows to determine when the IMS failure is to be considered as a complete call establishment failure. For example, when there is a failure at the IMS layer but the RRC timer has not yet expired, the eNB 122A may return the method 300 to 312. It should be noted that the number of pages may be reset upon the call establishment procedure succeeding such that when the eNB 122A returns the method 300 to 312 from 324, the lack of an acknowledgement and the return to 308 may not result in a page failure after a single attempt.

In a third mechanism, the eNBs 122A-C according to the exemplary embodiments may address a drawback related to mobile units when radio frequency (RF) conditions may prevent a radio resource control (RRC) connection release message from the LTE-RAN 122 from being received by the UE. This results in the UE and the LTE-RAN 122 being out of sync and prevents the LTE-RAN 122 from being able to properly page the UE for any downlink data and/or voice calls during this period. One approach to address this issue of missed RRC connection release messages entails using a timer where inactivity for the duration of the timer results in the UE declaring a radio link failure (RLF) to effectively place the UE and the LTE-RAN back into sync. However, the timer may be too long to prevent missed calls. For example, the timer may be set to 37 seconds. Thus, if the UE cannot be paged for these 37 seconds, the UE may miss calls or data transmissions. To address this issue, the eNBs 122A-C of the exemplary embodiments provide a dynamic manner of increasing a likelihood that any page that is transmitted during this particular timer period may still be received by the UE.

Figure 4:
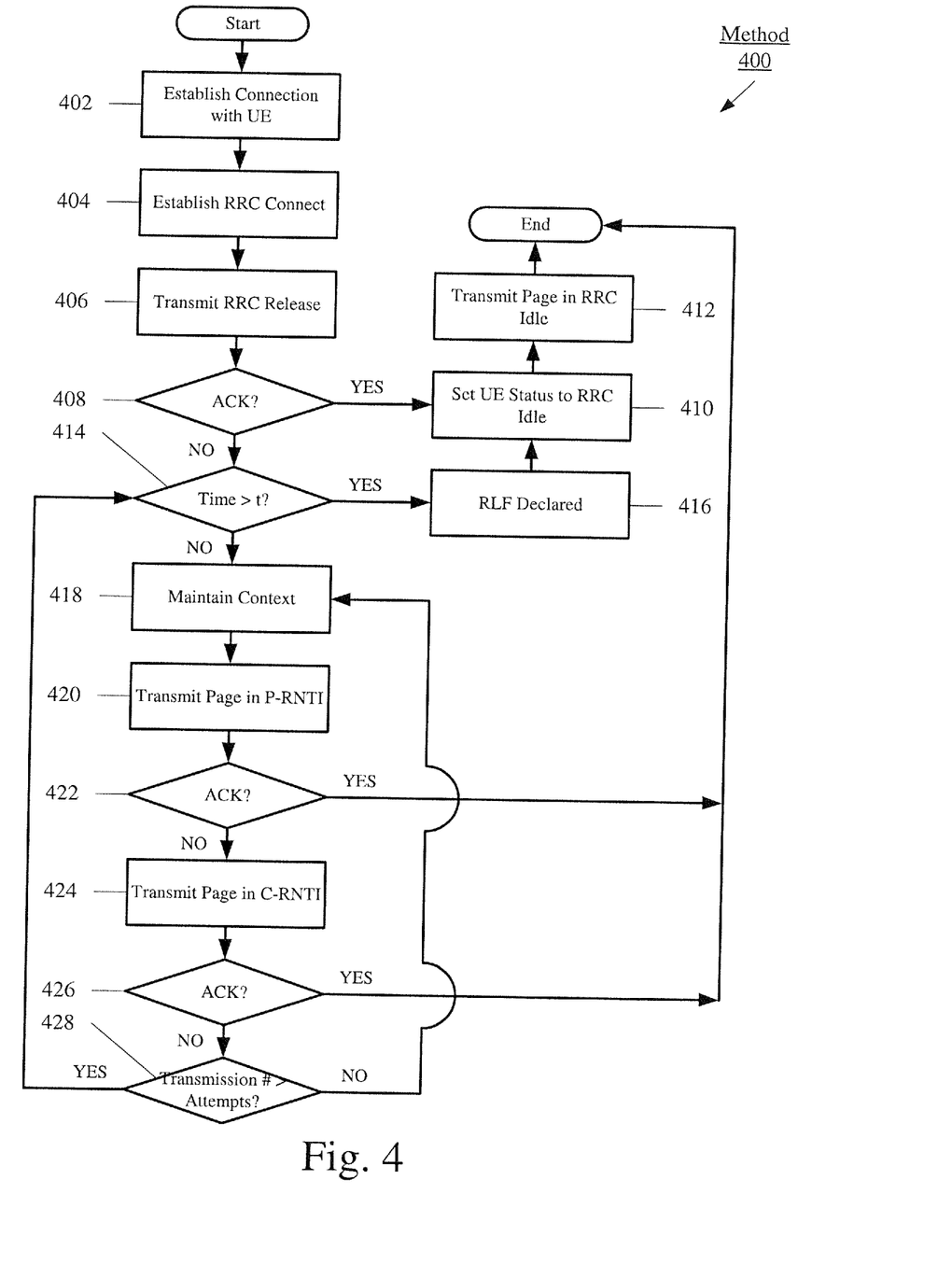
FIG. 4 shows an exemplary network method for transmitting a page to a user equipment according to various embodiments described herein.

FIG. 4 shows an exemplary network method 400 for transmitting a page to a UE. The network method 400 relates to a network operation. Specifically, the method 400 relates to a manner in which the eNB is configured to adaptively transmit a page to the UE. As will be described in further detail below, the method 400 may include a first transmission mode and a second transmission mode for a page to be transmitted where the eNB may select the transmission mode dynamically. For example, the transmission mode may use a Radio Network Temporary Identifier (RNTI) in which the first mode is a paging RNTI (P-RNTI) and the second mode is a cell RNTI (C-RNTI). It should be noted that the method 400 may relate to any mobile unit that connects to the LTE-RAN 122. However, the method 400 may be used more particularly for the constrained UEs 110-114 as certain failures have a higher expectation to occur for constrained devices than non-constrained mobile devices.

In 402, the LTE-RAN 122 establishes a connection with the UE. For example, the eNB 122A may connect to the UE 110 through an association and handshake procedure. In 404, the eNB 122A may establish a RRC connection with the UE 110. For example, the UE 110 may perform an active procedure that requires the RRC connected mode with the eNB 122A. Upon receiving a request from the eNB 122A, the RRC connected mode may be granted for the UIE 110 to perform the active procedure. When the active procedure has ended and/or the RRC connected mode is no longer required, the eNB 122A may release the RRC connection for the UE 110. Thus, in 406, a RRC connection release message is transmitted from the eNB 122A to the UE 110.

In 408, the eNB 122A determines whether an ACK has been received in response to the RRC connection release message. When RF conditions do not prevent the RRC connection release from being received, the eNB 122A may receive the ACK and continue the method 400 to 410. In 410, the eNB 122A may set the status of the UE to RRC idle because the RRC connection release was successful and the UE and the LTE-RAN 122 are in sync. Thus, in a subsequent paging procedure, in 412, the eNB 122 may transmit the page based upon the UE being in RRC idle mode.

Returning to 408, when the eNB 122A does not receive the ACK in response to the RRC connection release message, the eNB 122A may continue the method 400 to 414. Initially, it should be noted that the method 400 may include further processes where further attempts at transmitting the RRC connection release message may be performed prior to continuing to 414.

In 414, the eNB 122A determines whether the period of time from transmitting the RRC release message to a current time has exceeded a timer where the timer is a time period of inactivity when the UE declares a RLF. If the time has exceeded the timer, the eNB 122A continues the method 400 to 416 where the RLF has been declared. When the RLF has been declared, the eNB 122A may assume that the UE is operating in RRC idle mode despite not having received an ACK to the RRC connection release message. Subsequently, the eNB 122A may continue the method 400 to 410 and 412.

However, if the eNB 122A determines that the time has not exceeded the timer and the UE has not yet declared the RLF, the eNB 122A continues the method 400 to 418. In 418, the eNB 122A maintains the context with its C-RNTI for the UE as was used during the RRC connected mode. The context may be kept for a predetermined amount of time such as a time less than the timer.

When there is any downlink data transmission bound for the UE, the eNB 122A may attempt to page the UE. However, it is again noted that the eNB 122A and the UE must be in sync for the page to be properly received. With no ACK, the eNB 122A may be unsure as to whether the UE received the RRC connection release message transmitted in 406. For example, the UE may have never received the RRC connection release message and may be operating in the RRC connected mode. Accordingly, the ACK may never have been transmitted and could not have been received by the eNB 122A in this scenario. In another example, the UE may have received the RRC connection release message and may be operating in the RRC idle mode. However, the UE may not have been able to successfully transmit the ACK. Accordingly, the ACK was never received by the eNB 122A in this scenario. In view of these scenarios, the eNB 122A may be unsure as to the current state of the UE and a selection of one mode may be incorrect.

Thus, in 420, the eNB 122A may initially transmit the page using the P-RNTI with the assumption that the UE received the RRC connection release message and is operating in the RRC idle mode. In 422, the eNB 122A may determine whether an ACK is received in response to this page using the P-RNTI. If the page was received, the UE and the eNB 122A were in sync and the UE was operating in the RRC idle mode. Thus, the eNB 122A may continue the remaining downlink transmission procedure accordingly.

However, if the eNB 122A does not receive an ACK in response to the page transmitted with the P-RNTI, the eNB 122A continues the method 400 to 424. In 424, the eNB 122A transmits the page with the C-RNTI that was maintained despite the RRC connection release message having been already transmitted. In 426, the eNB 122A determines whether an ACK is received in response to the page with the C-RNTI. If the page was received, the UE and the eNB 122A were in sync and the UE was operating in the RRC connected mode. Thus, the eNB 122A may continue the remaining downlink transmission procedure accordingly.

If the ACK is still not received even though both transmission modes have been used, the eNB 122A may determine in 428 whether the number of transmissions exceeds a threshold attempt value. If further attempts may be made, the eNB 122A returns the method 400 to 418. However, if the number of transmissions exceeds the threshold attempt value, the eNB 122A may return to 414. It should be noted that the threshold attempt value may be selected to coincide with the timer. Thus, when every attempt has been exhausted, the eNB 122A may finally return to determine whether the time has exceeded the timer.

It should be noted that the manner in which the different transmission modes using the P-RNTI and the C-RNTI may be performed in a variety of manners. The method 400 provides one exemplary embodiment in which the P-RNTI and the C-RNTI are used in an alternating fashion. However, this is only exemplary. In other attempts, the P-RNTI may be used for a predetermined number of attempts prior to the C-RNTI being used also for the predetermined number of attempts. This may also be used in conjunction with the alternating manner.

In a fourth mechanism, the UEs 110-114 according to the exemplary embodiments may address a drawback related to mobile units when a handover may provide a more optimal connection to the LTE-RAN 122. Due to the constraints of the UEs 110-114, there may be a higher likelihood that a connection having limited uplink performance may not be sufficient. Thus, a handover to another eNB may be preferable. Specifically, on an antenna constrained mobile unit where uplink performance may be challenging, there may be an expectation that the mobile unit encounters situations where it fails to successfully send a measurement report or a handover procedure fails due to an extended transmission/reception timeline (such as due to the constraint). This may particularly be the case during a VoLTE call where a Connected Discontinuous Reception (C-DRX) cycle may be extended. One manner of addressing these scenarios is the eventual declaration of a RLF. However, the timer used for this declaration may be set at a high value such that the user experience may be impacted. The UEs 110-114 of the exemplary embodiments provide a proactive manner of performing a handover when issues with uplink performance are determined.

Figure 5:
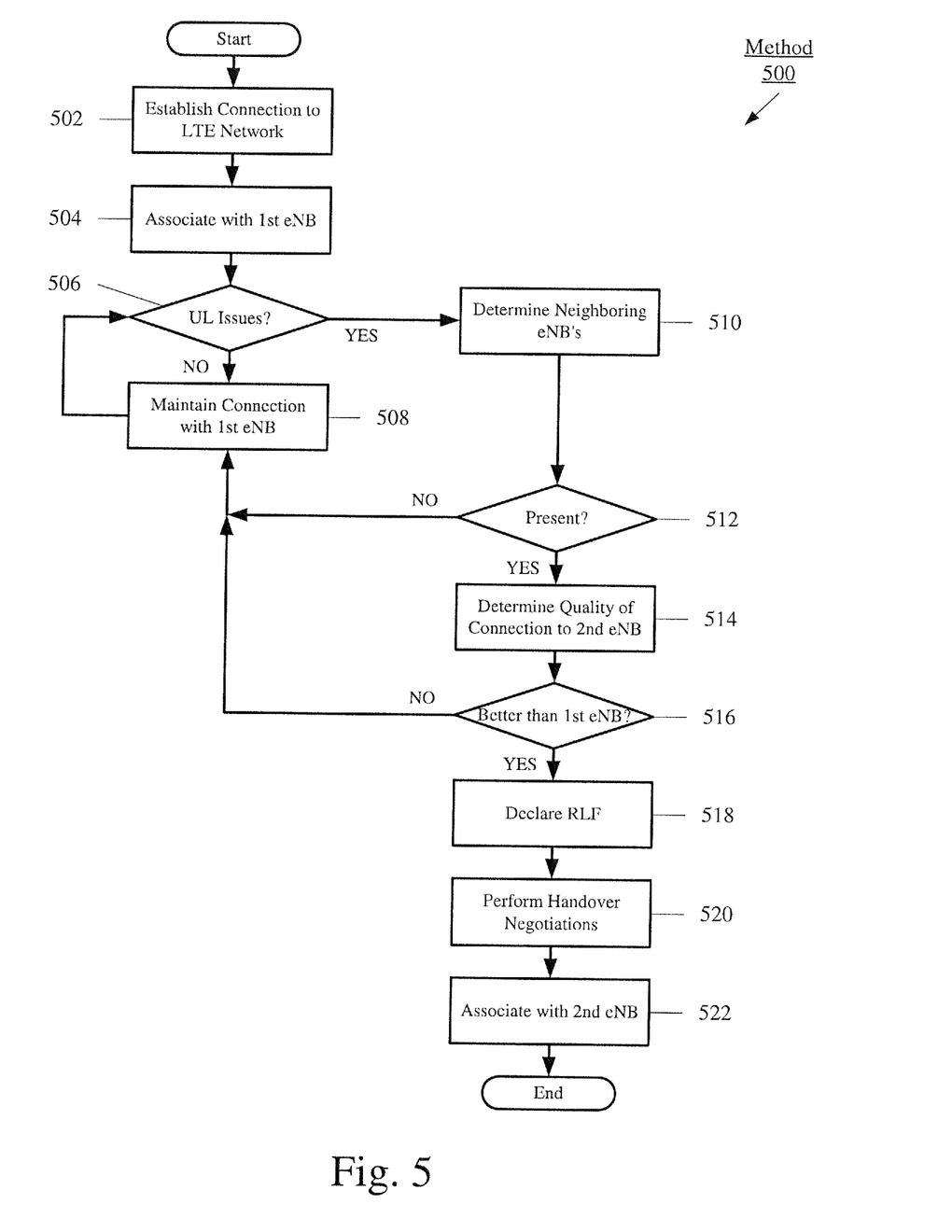
FIG. 5 shows an exemplary user equipment method for performing a handover according to various embodiments described herein.

FIG. 5 shows an exemplary UE method 500 for performing a handover. The UE method 500 relates to a UE operation. Specifically, the method 500 relates to a manner in which the UE is configured to transmit information that triggers a handover procedure to be performed to preempt a conventional mechanism to perform the handover. As will be described in further detail below, the UE may declare a RLF upon network parameters meeting certain criteria to trigger the LTE-RAN 122 to perform a handover procedure.

In 502, the UE establishes a connection with the LTE-RAN. In 504, the UE associates with a first eNB. For example, the UE 110 may connect to the LTE-RAN 122 through an association and handshake procedure with the eNB 122A. In 506, the UE 110 determines whether there are any uplink issues (e.g., the uplink has limited performance characteristics) with the current connection to the LTE-RAN 122 via the eNB 122A. For example, the limited uplink performance characteristics may be determined based upon an uplink block error rate (BLER) estimate, an uplink frequency band being used, a RF quality of neighboring cells, uplink frequency band of neighboring cells, etc. If the uplink is not experiencing limited performance characteristics, the UE 110 may continue the method to 508 where the connection and association with the eNB 122A is maintained.

If the UE 110 determines that the uplink is experiencing limited performance characteristics, the UE 110 continues the method 500 to 510. In 510, the UE 110 determines neighboring eNBs. As described above in the network arrangement 100, the LTE-RAN 122 may include a plurality of eNBs 122A-C that may be neighboring. Thus, the UE 110 may determine the presence of any of these neighboring eNBs. In 512, the UE 110 determines whether there are any neighboring eNBs that are available for a handover based upon a current position or capability of the UE/eNB. If no eNB is available, the UE 110 returns the method to 508 and maintains the connection with the eNB 122A.

If the UE 110 determines that there is at least one neighboring, available eNB, the UE 110 continues the method 500 to 514. In 514, the UE 110 determines a quality of a connection to one of these neighboring eNBs. For example, the UE 110 may determine a quality of a connection with the eNB 122B. The quality of the connection may be based upon a variety of known factors. For example, the quality of the connection may be determined on a quantitative basis using known measurements such as RSSI, RSRQ, BLER, SNR, etc. In 516, the UE 110 determines whether the connection to the eNB 122B is better than its current connection to the eNB 122A (e.g., which eNB offers the greater quantitative connection quality). If the connection to the current eNB 122A remains better than the potential connection to the eNB 122B, the UE 110 returns the method 500 to 508 and maintains the connection to the eNB 122A.

However, if the UE 110 determines that a potential connection to the eNB 122B will be an improvement over the connection to the eNB 122A, the UE 110 continues the method 500 to 518. Without waiting for any timer to expire, in 518, the UE 110 may declare a RLF even when a RLF is not actually present. The UE 110 may also perform a RACH with the eNB 122B for any RRC re-establishment procedure (assuming the LTE-RAN 122 can retrieve the context and is applicable for the neighboring cell). It should be noted that the LTE-RAN 122 may include a configuration where the context for the UE 110 is communicating in proximity to speed up any potential handover procedure or re-establishment for the UE 110.

In 520, the UE 110 may perform handover negotiations with the eNB 122A to select the eNB 122B that has been determined have a better connection for the UE 110. Subsequently, the UE 110 may associate with the eNB 122B. The UE 110 may perform these steps in a variety of manners. For example, the RACH may be performed by reading a System Information Block 2 (SIB2) of the neighboring eNBs to receive the RACH configuration. Thus, the UE 110 may preemptively read the SIB2 configuration of the strongest cells and/or the serving cell (e.g., the eNB 122A) may broadcast the information to the neighboring cells.

Figure 6:
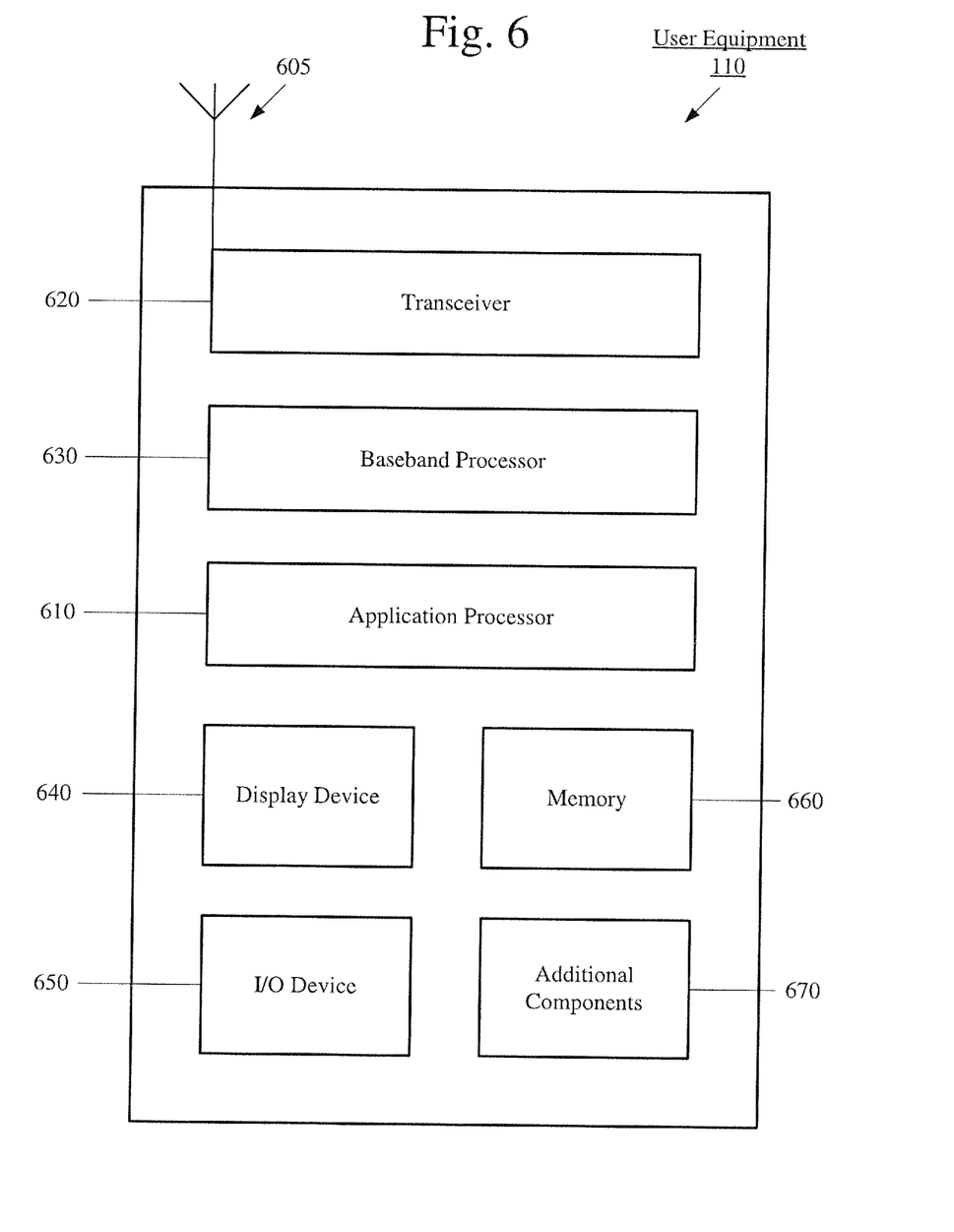
FIG. 6 shows an exemplary user equipment for improved system information reading procedure during cell selection and reselection according to various embodiments described herein.

FIG. 6 shows an exemplary embodiment of the UE 110 in FIG. 1. UEs 112 and 114 may have similar components and functionalities. The UE 110 may represent any electronic device that is configured to perform wireless functionalities. For example, as described above, the UE 110 may be a portable device such as a phone, a smartphone, a tablet, a phablet, a laptop, a wearable, etc. In another example, the UE 110 may be a stationary device such as a desktop terminal. The UE 110 may be a VoLTE-capable SRLTE device for communicating with a mobile switching center. The UE 110 may include an antenna 605 connected to a transceiver 620. The UE 110 may further include a baseband processor 630 and an applications processor 610. The UE 110 may further include a display 640, an I/O device 650, a memory arrangement 660 that are accessible by the baseband processor 630 or the applications processor 610. Those skilled in the art will understand that the UE 110 may also include additional components 670, for example, a Bluetooth/WiFi transceiver, further input devices (e.g., a keypad, a touchscreen, etc.), a battery, etc.

The transceiver 620, the baseband processor 630 and the application processor 610 may be used to perform operations such as, but not limited to, performing VoLTE calls, exchanging information with one or more base stations, etc. For example, the UE 110 may be utilized to perform the methods of FIG. 2A and FIG. 5. It should be noted that the exemplary embodiments are described as being performed by the transceiver 620, the baseband processor 630 and the application processor 610. However, any of these components may perform the described functionalities without the other component. In addition, other components may also perform some or all of the functionalities described herein. The application processor 610, the transceiver 620 and the baseband processor 630 may be, for example, general purpose processors, an application specific integrated circuit (ASIC), another type of integrated circuit and these processors may execute software programs or firmware.

Figure 7:
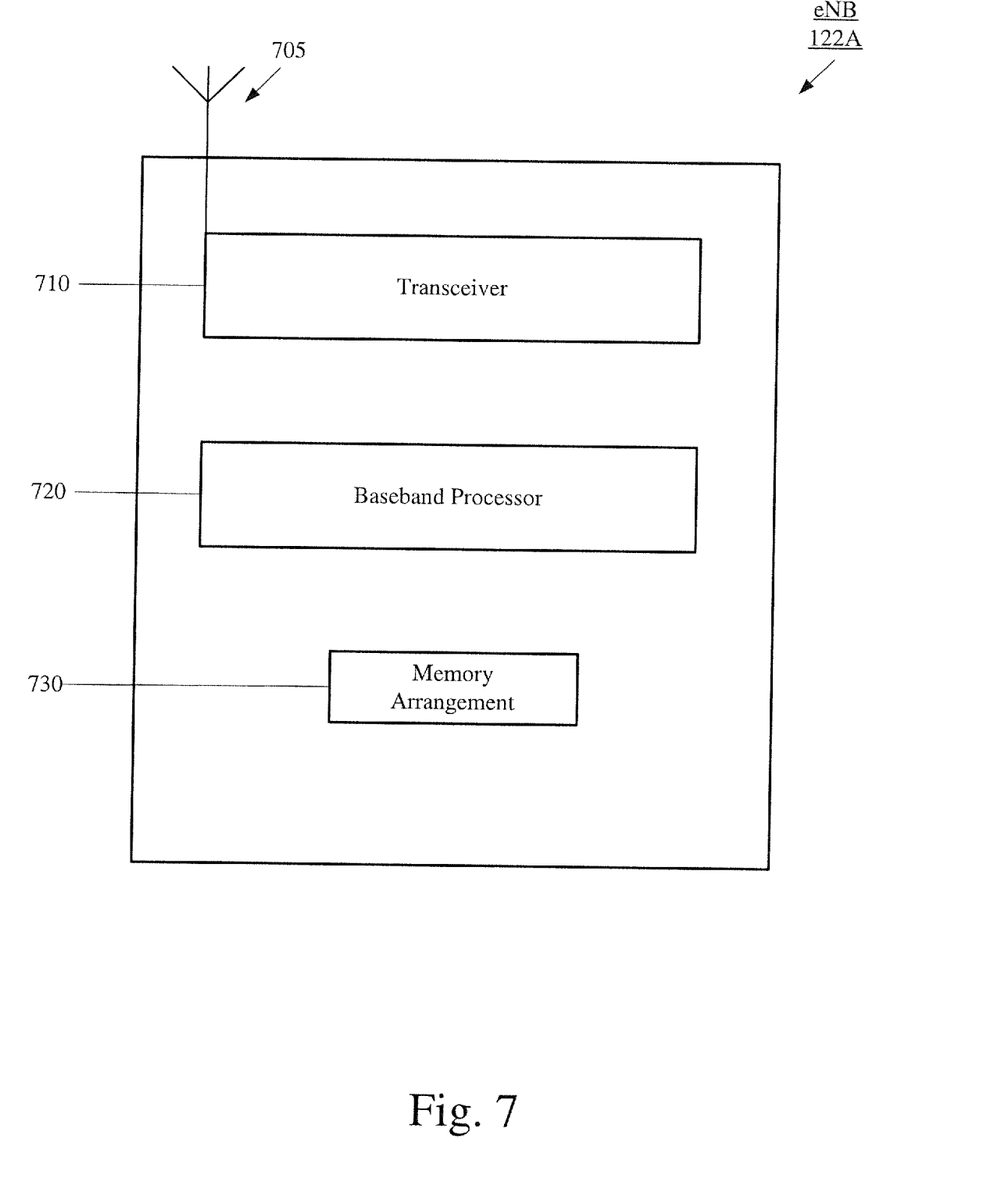
FIG. 7 shows an evolved Node B of the LTE network of FIG. 1 according to various embodiments described herein.

FIG. 7 shows an exemplary embodiment of the eNB 122A configured to establish a connection with the UEs 110, 112, 114 according to various embodiments described herein. The eNB 122A may be any access point or base station of the LTE-RAN NW 122 that enables the UEs 110, 112, 114 to establish a connection to the LTE-RAN NW 122. Further, the eNB 122A could be any access point or base station for the legacy RAN NW 120 and/or the WLAN 124. The eNB 122B and the eNB 122C may have similar components and functionalities. The eNB 122A may include an antenna 705 connected to a transceiver 710. The eNB 122A may further include a baseband processor 720 and a memory arrangement 730.

The baseband processor 720 may provide a radio communication with the UEs 110, 112, 114 via the transceiver 710, which may be coupled to an antenna. The transceiver 710 may be substantially similar to the transceiver 620 of the UE 110 such as operating on a predetermined frequency or channel of the LTE-RAN NW 122. It should be noted that the transceiver 710 may include a separate transmitter and receiver or a combined unit that performs the functionalities of the transmitter and receiver. The baseband processor 720 may be configured to operate according to a wireless communications standard based upon the LTE-RAN NW 122 (e.g., a 3GPP LTE). The eNB 122A may be utilized to perform, for example, the methods of FIG. 2B, FIG. 3 and FIG. 4.

The exemplary embodiments provide a system and method of improving operation of a user equipment that has known constraints compared to other mobile devices that do not have such constraints. In a first mechanism, data transmissions are controlled by being buffered when time-sensitive transmissions such as voice are being transmitted. In a second mechanism, a network component may perform additional procedures prior to determining a failure when the network component is aware of a reachability to the UE. In a third mechanism, a paging procedure may be adaptively used prior to a RLF being declared to increase a likelihood that the page is received during this time period. In a fourth mechanism, the UE may actively determine when a handover procedure is beneficial and trigger a serving cell to perform it.

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Mac platform and MAC OS, a mobile device having an operating system such as iOS, Android, etc. In a further example, the exemplary embodiments of the above described method may be embodied as a program containing lines of code stored on a non-transitory computer readable storage medium that, when compiled, may be executed on a processor or microprocessor.

It will be apparent to those skilled in the art that various modifications may be made in the present invention, without departing from the spirit or the scope of the invention. Thus, it is intended that the present invention cover modifications and variations of this invention provided they come within the scope of the appended claims and their equivalent.

What is claimed is:

1. A method, comprising:
   at a network component of a network configured to establish a connection with a user equipment:
   determining a type of the user equipment;
   performing a voice call with the user equipment;
   determining a downlink data transmission for the user equipment is to be performed while the voice call is being performed;
   storing the downlink data transmission in a buffer when the user equipment is a predetermined type;
   determining whether a size of the downlink data transmission is less than a predetermined threshold: and
   transmitting the downlink data transmission during a silence period of the voice call when the size of the downlink data transmission is less than the predetermined threshold.

2. The method of claim 1, further comprising:
   transmitting the downlink data transmission when the voice call has been determined to have ended.

3. The method of claim 1, further comprising:
   determining whether the user equipment has an uplink data transmission for the network component while the voice call is being performed; and
   receiving the uplink data transmission during a silence period of the voice call.

4. The method of claim 1, wherein the network component comprises a base station of a cellular network.

5. The method of claim 1, wherein the voice call is a Voice over LTE (VoLTE) call.

6. The method of claim 1, further comprising:
   when the size of the downlink data transmission is greater than the predetermined threshold, transmitting the downlink data transmission when the voice call is completed.

7. The method of claim 1, wherein the predetermined threshold is based on at least a capability of the user equipment.

8. A base station, comprising:
   a transceiver;
   a non-transitory memory having a program stored thereon; and
   a processor executing the program, wherein the execution of the program causes the processor to perform operations comprising;
   determining a type of user equipment in connection with a network;
   performing a voice call with the user equipment;
   determining a downlink data transmission for the user equipment is to be performed while the voice call is being performed;
   storing the downlink data transmission in a buffer when the user equipment is a predetermined type;
   determining whether a size of the downlink data transmission is less than a predetermined threshold; and
   transmitting the downlink data transmission during a silence period of the voice call when the size of the uplink data transmission is less than the predetermined threshold.

9. The base station of claim 8, wherein the operations further comprise:
   transmitting the downlink data transmission when the voice call has been determined to have ended.

10. The base station of claim 8, wherein the operations further comprise:
    determining whether the user equipment has an uplink data transmission for the network component while the voice call is being performed; and
    receiving the uplink data transmission during a silence period of the voice call.

11. The base station of claim 8, wherein determining the type of user equipment comprises determining one of an antenna capability of the user equipment or a power capability of the user equipment.

12. The base station of claim 8, wherein the voice call is a Voice over LTE (VoLTE) call.

13. The base station of claim 8, wherein the operations further comprise:
    when the size of the downlink data transmission is greater than the predetermined threshold, transmitting the downlink data transmission when the voice call is completed.

14. The base station of claim 8, wherein the predetermined threshold is based on at least a capability of the user equipment.

15. An integrated circuit, comprising:
    circuitry to establish a connection with a user equipment;
    circuitry to determine a type of the user equipment;
    circuitry to perform a voice call with the user equipment;
    circuitry to determine a downlink data transmission for the user equipment is to be performed while the voice call is being performed;

circuitry to store the downlink data transmission in a buffer when the user equipment is a predetermined type;

circuitry to determine whether a size of the downlink data transmission is less than a predetermined threshold; and circuitry to transmit the downlink data transmission during a silence period of the voice call when the size of the downlink data transmission is less than the predetermined threshold.

16. The integrated circuit of claim 15, further comprising:

circuitry to transmit the downlink data transmission when the voice call has been determined to have ended.

17. The integrated circuit of claim 15, wherein a network component of a cellular network comprises the integrated circuit.

* * * * *